United States Patent [19]
Velan

[11] Patent Number: 6,095,493
[45] Date of Patent: Aug. 1, 2000

[54] HIGH PRESSURE VALVE

[75] Inventor: Adolf Karel Velan, Westmount, Canada

[73] Assignee: Velan Inc., Montreal, Canada

[21] Appl. No.: 09/231,835

[22] Filed: Jan. 15, 1999

[51] Int. Cl.[7] .................................................. F16K 31/44
[52] U.S. Cl. ..................... 251/214; 251/315; 251/315.01
[58] Field of Search .................................. 251/214, 213, 251/228, 315.01, 315.1, 315.13, 1.1

[56] References Cited

U.S. PATENT DOCUMENTS

| | | | |
|---|---|---|---|
| 4,177,972 | 12/1979 | Legris | 251/214 |
| 4,475,712 | 10/1984 | DeJager | 251/214 |
| 4,762,301 | 8/1988 | Wozniak et al. | 251/214 |

*Primary Examiner*—David J. Walczak
*Attorney, Agent, or Firm*—Birch, Stewart, Kolasch & Birch, LLP

[57] ABSTRACT

A valve comprises a one piece valve body defining a fluid passage in which a closure member is disposed for selectively allowing and blocking fluid flow therethrough. A top entry stem extends into the valve body to transmit motion to the closure member. An integral external retainer is provided for cooperating with an outer abutment surface of the stem to prevent the same from being blown out of the valve body during use. A thrust bearing is disposed between the abutment surface of the stem and the external retained to reduce the operating torque. The one piece valve body design eliminates the joints and seals which are potential leak paths and the external retainer ensures that the thrust bearing be not influence by the temperature of the processed fluid.

14 Claims, 3 Drawing Sheets

HIGH PRESSURE VALVE

BACKGROUND OF THE INVENTION

1. Field of the Invention

The present invention relates to valves and, more particularly, pertains to high pressure valves.

2. Description of the Prior Art

Conventional high pressure rotary valves, such as plug and ball valves, generally comprise a valve body defining a fluid passage in which a rotary closure member having a bore extending therethrough is mounted to selectively block or allow the flow of a fluid. A stem is provided to rotate the closure member between an open position in which the bore through the closure member is in alignment with the fluid passage of the valve body and a closed position in which the bore through the closure member extends transversely to the fluid passage of the valve body. The stem extends from the interior of the valve body through a stem passage normal to the fluid passage. Typically, a bonnet is bolted to the valve body for cooperating with a shoulder provided at the bottom of the stem to prevent the same from being blown out when submitted to high internal fluid pressure. Alternatively, the stem may be inserted through one end of a single piece valve body and then internally retained in place by means of an internal abutment surface defined in the stem passage of the valve body for cooperating with the shoulder provided at the bottom of the stem.

Although the above stem and valve body connections are efficient to prevent the stem from being blown out of the valve body, they substantially increase the torque required to operate the valve. Accordingly, a washer is generally installed between the stem shoulder and the cooperating abutment surface of the valve body in order to reduce the operating torque. However, in applications where the processed fluid is at a relatively high temperature, the installation of such a washer is problematic.

SUMMARY OF THE INVENTION

It is therefore an aim of the present invention to provide a high pressure valve which provides stem blowout protection without significantly increasing the torque required to operate the valve.

It is also an aim of the present invention to provide such a valve which is relatively simple and economical to manufacture.

Therefore, in accordance with the present invention there is provided a high pressure valve comprising a one piece valve body, defining a fluid passage extending along a flow axis, a closure member mounted within the valve body and having a bore extending therethrough. A stem is engaged with the closure member and extends outwardly of a stem passage defined in the valve body for rotating the closure member, about a pivot axis transverse to the flow axis, between an open position wherein the bore is coaxially aligned with the fluid passage of the valve body and a closed position wherein the bore extends transversally to the fluid passage. A sealing system is provided for preventing leakage from the valve body along the stem passage. The high pressure valve further comprises a stem blowout protection system including a platform spaced from the valve body and defining an opening aligned with the stem passage for receiving the stem therethrough. The platform and the valve body are of unitary construction. Bearing means are provided on the stem between the platform and the valve body outwardly of the sealing system for cooperating with the platform to prevent the stem from being blown out from the valve body due to fluid pressure within the valve body, said bearing means including a split bushing mounted on said stem against a peripheral shoulder thereof, thereby allowing said stem to be installed within said valve body and removed therefrom through said opening of said platform and said stem passage.

In accordance with a further general aspect of the present invention there is provided a high pressure valve comprising a one piece valve body, defining a fluid passage extending along a flow axis, a closure member mounted within said valve body and having a bore extending therethrough, a stem engaged with said closure member and extending outwardly of a stem passage defined in said valve body for rotating said closure member, about a pivot axis transverse to said flow axis, between an open position wherein said bore is coaxially aligned with said fluid passage of said valve body and a closed position wherein said bore extends transversally to said fluid passage, a sealing system for preventing leakage from said valve body along said stem passage, and stem blowout protection system including a platform spaced from said valve body and defining an opening aligned with said stem passage for receiving said stem therethrough, said platform and said valve body being of unitary construction, and bearing means provided on said stem between said platform and said valve body outwardly of said sealing system for cooperating with said platform to prevent said stem from being blown out from said valve body due to fluid pressure within said valve body, wherein said sealing system includes a packing mounted within said stem passage in said valve body about said stem, and a gland member disposed in a free space between said platform and said valve body about said stem for compressing said packing.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Figure 1:
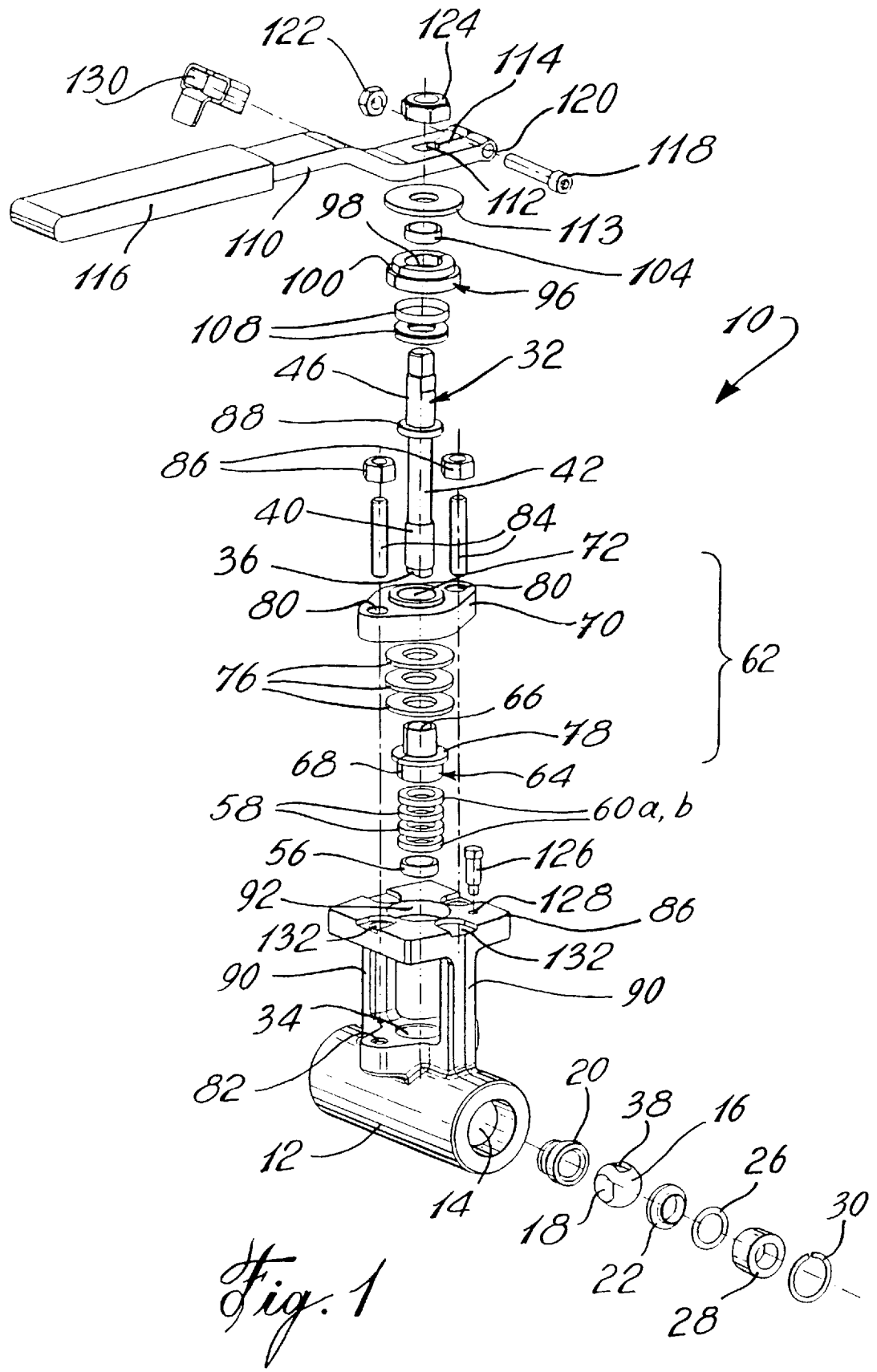
FIG. 1 is an exploded perspective view of a ball valve in accordance with the present invention.

Now referring to the drawings, and in particular to FIGS. 1 to 3, a high pressure valve embodying the elements of the present invention and generally designated by numeral 10 will be described. The high pressure valve 10 includes a single piece valve body 12 defining an axially extending fluid passage 14 in which a ball valve member 16 is mounted for selectively blocking and allowing fluid flow through the valve body 12. The ball valve member 16 has a spherical outer surface and a central bore 18 extending therethrough. The spherical outer surface of the ball valve member 16 is sealingly engaged with a downstream valve seat 20 and an upstream valve seat 22. As seen in FIG. 2, the downstream valve seat 20 fits within a recess 24 defined axially inwardly in the valve body 12 about the fluid passage 14.

A load ring 26 and a spacing insert 28 are positioned immediately upstream of the upstream valve seat 22 and a retaining ring 30 is disposed in an annular groove defined in the valve body 12 about the inside of the fluid passage 14 in order to maintain the upstream valve seat 22, the load ring 26 and the spacing insert 28 in position within the valve body 12.

The downstream and upstream valve seats 20 and 22 may be formed of metal.

A one piece stem 32 extending through a stem passage 34 defined in the valve body 12 is connected at a bottom end thereof to the valve ball member 16 to rotate the same, about a pivot axis normal to the fluid passage 14, between an open position in which the central bore 18 is in axial alignment with the fluid passage 14 and a closed position in which the central bore 18 is transversal to the fluid passage 14. The bottom end of the stem 32 defines two diametrically opposed parallel flats 36 which fit within a slot 38 defined in the upper surface of the ball valve member 16 to effect rotation of the ball member 16 upon rotation of the stem 32.

The stem 32 includes a bottom enlarged portion 40 adjacent the bottom end defining the flats 36, an intermediate small diameter portion 42 adjacent the bottom enlarged portion 40 defining a shoulder 44 therebetween, and an enlarged diameter upper portion 46.

Figure 3:
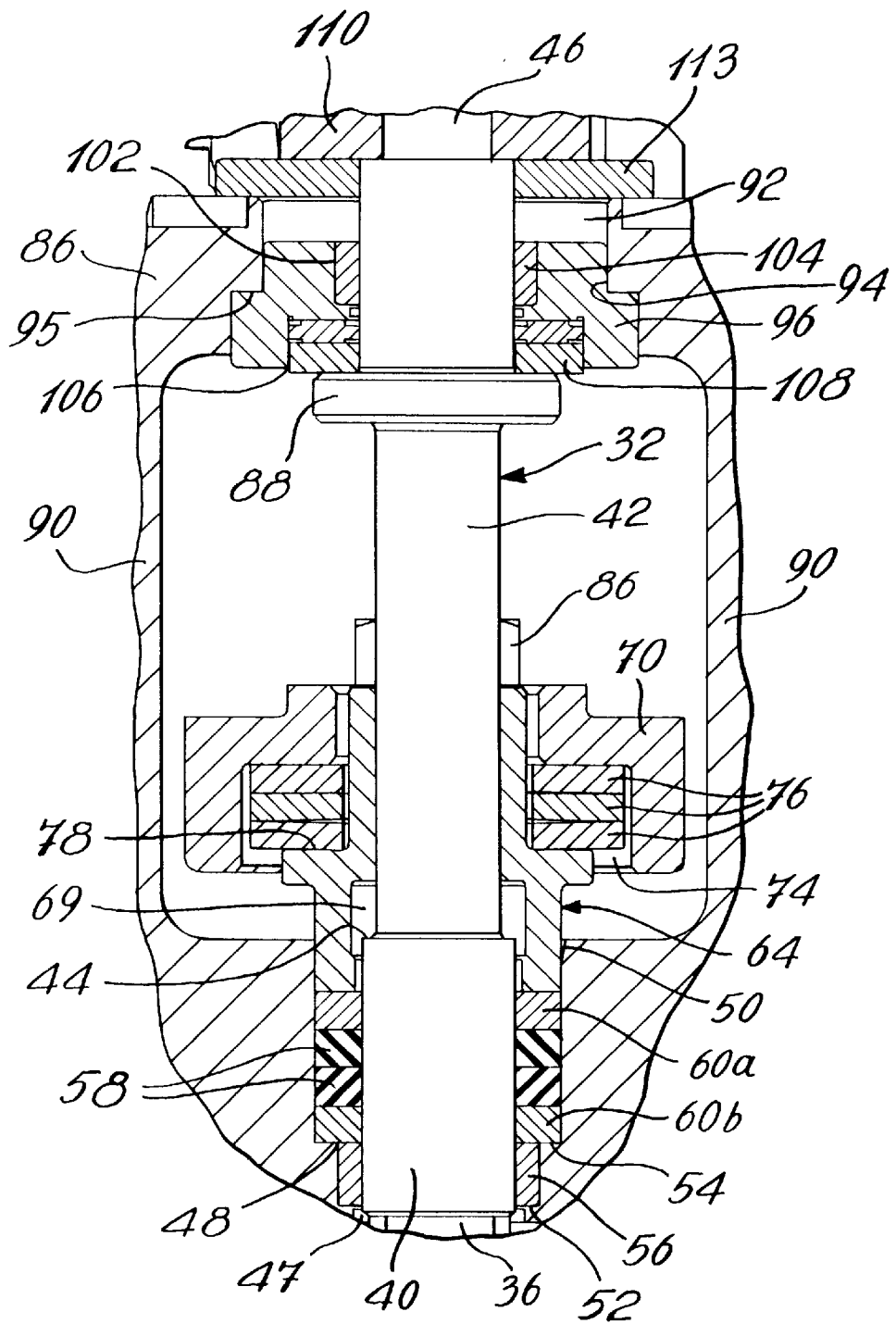
FIG. 3 is an enlarged cross-sectional view illustrating the details of a stem assembly of the ball valve.

As seen in FIG. 3, the stem passage 34 defines a small diameter inner portion 47 leading to the fluid passage 14, an intermediate diameter portion 48 adjacent the small diameter inner portion 47, and an enlarged diameter outer portion 50. A first shoulder 52 is formed between the small diameter inner portion 47 and the intermediate diameter portion 48, while a second shoulder 54 is formed between the intermediate diameter portion 48 and the enlarged diameter outer portion 50.

A bushing 56 defining a central passage therethrough is seated against the first shoulder 52 about the bottom enlarged portion 40 of the stem 32. The bushing 56 serves as a bearing and a bottom guide for the stem 32.

The bottom enlarged portion 40 of the stem 32 defines with the enlarged diameter outer portion 50 of the stem passage 34 an annular packing chamber which is filled by a suitable packing, including two packing rings 58 disposed between a top extrusion ring 60a and a bottom extrusion ring 60b, for preventing leakage from the fluid passage 14 about the stem 32. The bottom extrusion ring 60b is seated against the second shoulder 54.

The packing is maintained under axial compression by a gland assembly 62. The gland assembly 62 includes a metal split gland bushing 64 mounted on the stem 32 and positioned over the outer surface of the top extrusion ring 60a. The split gland bushing 64 defines an axially extending bore 66 (see FIG. 1) which fits against the intermediate small diameter portion 42 of the stem 32. As seen in FIG. 1, the split bushing 64 has an open longitudinal slit 68 which allows it to be spread open and then placed tightly around the stem 32. As seen in FIGS. 2 and 3, an axially extending recess 69 is defined in the lower end portion of the split gland bushing 64 about the inside of the axially extending bore 66 for receiving the upper end of the bottom enlarged portion 40 of the stem 32. As will be explained in more details hereinafter, the split bushing 64 allows the stem 32 to be loaded in the valve body 12 through the stem passage 34 from the outside of the valve body 12.

The gland assembly 62 further includes a gland member 70 having a central longitudinal bore 72 (see FIG. 1) through which an upper portion of the split gland bushing 64 extends. As best seen in FIG. 3, a recess 74 is formed axially inwardly in the gland member 70 about the inside of the central bore 66 for receiving three Belleville washers 76 disposed about the split bushing 64 against an annular shoulder 78 thereof, thereby providing spring means for a degree of self-adjustment to compensate for wear of the packing. As seen in FIG. 1, the gland member 70 is connected to the valve body 12 by means of a pair of threaded studs 84 extending through respective axially extending lateral bores 80 defined in the gland member 70 and into corresponding bores 82 defined in the portion of the valve body 12 surrounding the stem passage 34. Packing adjustment nuts 86 are threadably engaged with the upper ends of the studs 84 to compress the Belleville washers 76 against the shoulder 78 thereby causing the split gland bushing 64 to apply a compressive load on the packing.

A platform 86 is remotely connected to the valve body 12 for cooperating with an annular shoulder 88 provided at the outer axial end of the intermediate small diameter portion 42 of the stem member 32 in preventing the latter from being blown out from the stem passage 34 due to fluid pressure inside of the valve body 12. According to a preferred construction of the present invention, the platform 86 is provided with a pair of lateral elongated members 90 extending downwardly therefrom to the outer surface of the valve body 12 on opposed sides of the stem 32 in order to form an integral platform and valve body arrangement. In fact, the platform 86 and the elongated members 90 are cast in one piece with the valve body 12. As seen in FIG. 1, the platform 86 defines a central bore 92 which is in coaxial alignment with the stem passage 34 of the valve body 12 for receiving the stem 32 therethrough. A recess 94 is formed in the undersurface of the platform 86 about the inside of the central bore 92 and defined therewith an annular shoulder 95.

A split bushing 96 defining a central opening 98 is disposed within the recess 94 about the enlarged diameter upper portion 46 of the stem 32 against the shoulder 88 thereof. The split bushing 96 is provided with a bottom flange 100 which is in abutment relationship with the annular shoulder 95 of the platform 86 to prevent axial removal of the stem 32 from the valve body 12 due to fluid pressure within the valve body 12. The stem 32, the gland member 70 and the split gland bushing 64 also constitute a secondary explosion security or stem blowout protection, as the bottom enlarged portion 40 of the stem 32 is larger than the bore 66 of the split gland bushing 64 which is disposed within the recess 74 defined in the gland member 70.

As best seen in FIG. 3, the split bushing 96 defined in an upper end portion thereof has an axially extending recess 102 about the inside of the opening 98 for receiving a stem bushing 104 mounted on the enlarged diameter upper portion 46 of the stem 32. An axially extending recess 106 is also formed in the lower end portion of the split bushing 96 about the inside of the opening 98 for receiving a sealed thrust bearing 108 mounted on the enlarged diameter upper portion 46 of the stem 32.

Figure 2:
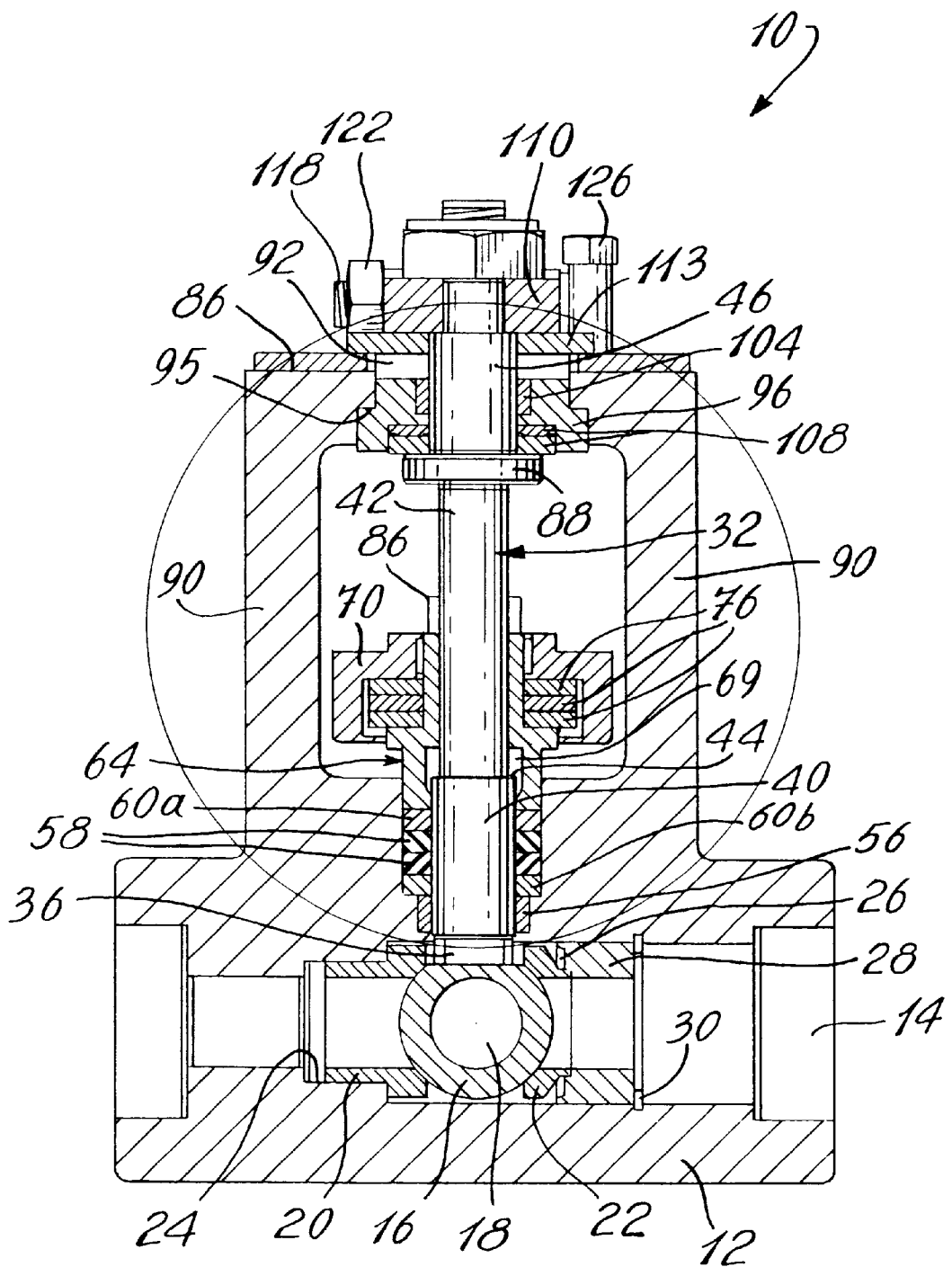
FIG. 2 is a longitudinal cross-sectional view of the ball valve of FIG. 1.

As seen in FIG. 1, a lever 110 defining a square hole 112 is mounted to the upper square shaped end of the stem 32. A thrust washer 113 is mounted on the stem 32 between the lever 110 and the stem supporting plate 86. A slit 114 extends from the square hole 112 to one end of the lever 110 opposed to a handle 116 thereof. A socket head cap screw 118 is inserted in a passage 120 extending transversally of the slit 114 for cooperating with a nut 122 to provide adjustment of the size of the hole 112. A lock nut 124 is threadably engaged to the end of the stem 32 to secure the lever 110 to the stem 32.

A stop pin 126 is threadably mounted at a lower end thereof in a hole 128 defined in the top surface of the platform 86 to limit the rotation of the stem 32 by engaging the lever 110 when the ball member 16 is rotated in the closed position thereof.

A lock clip 130 is mounted for axial movement along the lever 110 for engaging associated notches 132 defined in the top surface of the platform 86 in order to selectively lock the valve 10 in the closed and open positions thereof.

In initial assembly of the valve 10, the downstream seat 20 is first inserted in place within the valve body 12 through the upstream end thereof. Afterwards, the stem bushing 56, the lower anti extrusion ring 60b, the packing rings 58 and the upper anti extrusion ring 60a are successively loaded in the valve body 12 through the stem passage 34. Thereafter, the stem 32 is inserted through the central bore 92 of the platform 86 and the gland member 70 and the Belleville washers 76 are slid axially onto the lower end of the stem 32 up to the intermediate small diameter portion 42 thereof. Once the gland member 70 and the Belleville washers 76 have been mounted on the stem 32, the split gland bushing 64 is installed in position on the stem 32. The stem 32 is then pushed downwardly into the stem passage 34 so as to permit the installation of the sealed thrust bearing 108, the split bushing 96 and the stem bushing 104. The sealed thrust bearing 108 is first slid onto the upper end of the stem down against the shoulder 88. Then, the split bushing 96 is spread open and installed around the stem 32 before the stem bushing 104 be slid onto the upper end of the stem 32 down into the recess 102 formed in the split bushing 96. After having mounted the sealed thrust bearing 108, the split bushing 96 and the stem busing 104 on the stem 32, the latter is displaced upwardly so as to abut the annular flange 100 of the split bushing 96 against the internal shoulder 95 of the platform 86. The ball member 16 is then inserted into the valve body 12 through the upstream end thereof with the slot 38 extending in the direction of the flow passage 14 to engage the flats 36 defined at the bottom end of the stem 32. Thereafter, the upstream valve seat 22, the load ring 26, the spacing insert 28 and the retaining ring 30 are installed in the valve body 12 via the upstream end thereof and the gland member bolting 84, 86 is tightened up. Finally, the lever 110 is installed on the stem 32 and secured by the lock nut 124. The stop pin 126 may be virtually fixed at any time to the platform 86.

From the above, it can be seen that the split bushings 64 and 96 allow the one piece body stem 32 to be installed within the one piece valve body 12 through the stem passage 34, while at the same preventing the stem to be axially removed from the valve body 12 due to fluid pressure.

One advantage of the above described high pressure valve 10 is that the one piece body design eliminates the joints and seals which are potential leak paths. Furthermore, the stem 32 is retained at a remote location from the valve body 12, externally of the packing, and thus the sealed thrust bearing 108, which ensures low operating torque, is not influenced by the temperature of the processed fluid. This thus increases the life expectancy of the thrust bearing 108 and consequently increases the reliability of the high pressure valve 10, while at the same time providing effective stem blowout protection.

In addition to the above mentioned advantages, the fact that the platform 86 is integral to the one piece valve body 12 ensures perfect alignment of the stem 32, thereby preventing premature wear of the stem packing. The fact that the stem 32 is guided at the bottom end and upper ends thereof prevents side loads which could damage the packing and thus cause leakage.

According to another embodiment of the present invention which is not illustrated, the lever extends laterally on each side of the stem 32 and is provided at each end thereof with a handle.

What is claimed is:

1. A high pressure valve comprising a one piece valve body, defining a fluid passage extending along a flow axis, a closure member mounted within said valve body and having a bore extending therethrough, a stem engaged with said closure member and extending outwardly of a stem passage defined in said valve body for rotating said closure member, about a pivot axis transverse to said flow axis, between an open position wherein said bore is coaxially aligned with said fluid passage of said valve body and a closed position wherein said bore extends transversally to said fluid passage, a sealing system for preventing leakage from said valve body along said stem passage, and a stem blowout protection system including a platform spaced from said valve body and defining an opening aligned with said stem passage for receiving said stem therethrough, said platform and said valve body being of unitary construction, and bearing means provided on said stem between said platform and said valve body outwardly of said sealing system for cooperating with said platform to prevent said stem from being blown out from said valve body due to fluid pressure within said valve body, said bearing means including a split bushing mounted on said stem against a peripheral shoulder thereof, thereby allowing said stem to be installed within said valve body and removed therefrom through said opening of said platform and said stem passage.

2. A high pressure valve as defined in claim 1, wherein said stem has a unitary body.

3. A high pressure valve as defined in claim 1, wherein said opening of said platform has an enlarged radial portion and an adjacent reduced radial portion defining therebetween an annular shoulder for engaging a radial flange of said split bushing to prevent axial removal of said stem from said valve body due to fluid pressure within said valve body.

4. A high pressure valve as defined in claim 3, wherein said split bushing defines a central opening having a to enlarged radial portion for receiving a stem bushing mounted on said stem and an adjacent bottom enlarged radial portion for receiving a thrush bearing compressed against said peripheral shoulder of said stem.

5. A high pressure valve as defined in claim 1, wherein said sealing system includes a packing mounted within said stem passage in said valve body about said stem, and a gland member disposed in a free space between said platform and said valve body about said stem for compressing said packing.

6. A high pressure valve as defined in claim 5, wherein said gland member defines an axially extending bore through which said stem extends, said axially extending bore having an enlarged radial bottom portion receiving spring means, said spring means being mounted about a gland bushing mounted on said stem and biased between an outer abutment surface of said gland bushing and an inner abutment surface of said gland member, said gland bushing being in contact with said packing.

7. A high pressure valve as defined in claim 6, wherein said stem has a bottom shoulder positioned outwardly of said packing, said bottom shoulder being larger than a stem receiving opening defined in said gland bushing, thereby providing a secondary stem blowout protection.

8. A high pressure valve as defined in claim 7, wherein said gland bushing is split for ease of installation.

9. A high pressure valve as defined in claim 1, wherein said platform includes two lateral elongated members extending downwardly therefrom to an outer surface of said valve body on opposed sides of said stem.

10. A high pressure valve comprising a one piece valve body, defining a fluid passage extending along a flow axis, a closure member mounted within said valve body and having a bore extending therethrough, a stem engaged with said closure member and extending outwardly of a stem passage defined in said valve body for rotating said closure member, about a pivot axis transverse to said flow axis, between an open position wherein said bore is coaxially aligned with said fluid passage of said valve body and a closed position wherein said bore extends transversally to said fluid passage, a sealing system for preventing leakage from said valve body along said stem passage, and a stem blowout protection system including a platform spaced from said valve body and defining an opening aligned with said stem passage for receiving said stem therethrough, said platform and said valve body being of unitary construction, and bearing means provided on said stem between said platform and said valve body outwardly of said sealing system for cooperating with said platform to prevent said stem from being blown out from said valve body due to fluid pressure within said valve body, wherein said sealing system includes a packing mounted within said stem passage in said valve body about said stem, and a gland member disposed in a free space between said platform and said valve body about said stem for compressing said packing.

11. A high pressure valve as defined in claim 10, wherein said gland member defines an axially extending bore through which said stem extends, said axially extending bore having an enlarged radial bottom portion receiving spring means, said spring means being mounted about a gland bushing mounted on said stem and biased between an outer abutment surface of said gland bushing and an inner abutment surface of said gland member, said gland bushing being in contact with said packing.

12. A high pressure valve as defined in claim 11, wherein said stem has a bottom shoulder positioned outwardly of said packing, said bottom shoulder being larger than a stem receiving opening defined in said gland bushing, thereby providing a secondary stem blowout protection.

13. A high pressure valve as defined in claim 12, wherein said gland bushing is split for ease of installation.

14. A high pressure valve as defined in claim 10, wherein said bearing means include a split bushing mounted on said stem against a peripheral shoulder thereof.

* * * * *